(12) United States Patent
Mannby

(10) Patent No.: US 11,636,188 B2
(45) Date of Patent: Apr. 25, 2023

(54) COMBINING BIOMETRICS, HIDDEN KNOWLEDGE AND INTENT TO AUTHENTICATE

(71) Applicant: Microsoft Technology Licensing, LLC, Redmond, WA (US)

(72) Inventor: Claes-Fredrik U. Mannby, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 329 days.

(21) Appl. No.: 16/550,968

(22) Filed: Aug. 26, 2019

(65) Prior Publication Data

US 2021/0064726 A1    Mar. 4, 2021

(51) Int. Cl.
*G06F 21/32* (2013.01)

(52) U.S. Cl.
CPC .................... *G06F 21/32* (2013.01)

(58) Field of Classification Search
CPC ...................................... G06F 21/32
See application file for complete search history.

(56) References Cited

U.S. PATENT DOCUMENTS

| | | | | |
|---|---|---|---|---|
| 9,218,474 B1* | 12/2015 | Roth | ........................ | G06F 21/32 |
| 10,686,836 B1* | 6/2020 | Stolfo | .................... | H04L 63/105 |
| 11,115,409 B2* | 9/2021 | Shattuck | ................ | G06N 3/084 |
| 2005/0022034 A1* | 1/2005 | Chaudhari | .............. | G06F 21/32 |
| | | | | 726/19 |
| 2007/0038035 A1* | 2/2007 | Ehrlich | ..................... | A61B 5/16 |
| | | | | 128/920 |
| 2009/0063866 A1* | 3/2009 | Navratil | ................. | A61B 5/378 |
| | | | | 706/47 |
| 2013/0336547 A1 | 12/2013 | Komogortsev | | |
| 2014/0020089 A1* | 1/2014 | Perini, II | ................ | G06F 21/32 |
| | | | | 726/19 |

(Continued)

OTHER PUBLICATIONS

Avila, et al., "State of the art of mobile biometrics, liveness and non-coercion detection", In Collaborative Project supported by the 7th Framework Programme of the EC, Mar. 4, 2014, 135 Pages.

(Continued)

*Primary Examiner* — James R Turchen
(74) *Attorney, Agent, or Firm* — Weaver IP L.L.C.

(57) ABSTRACT

A computing device is configured to verify a user's identity, intent to authenticate, and/or possession of secret knowledge by evaluating biometric and/or environmental data. In embodiments, such verification is performed by evaluating a user's reaction to a stimulus based on such data. Biometric data may comprise eye tracking data, and a computing device may be configured to use such data to verify that the person has gazed through objects in a predetermined order. In embodiments, the user's intent to authenticate is verified by combining such eye tracking data with other biometric data. Physiological and other types of biometric data may be used to evaluate the user for indicia of duress. Embodiments may be configured to provide modified access to the computing device or resources stored thereon where indicia of duress have been detected. Such modified access may comprise hiding information stored on the device.

20 Claims, 8 Drawing Sheets

(56) References Cited

U.S. PATENT DOCUMENTS

| | | | |
|---|---|---|---|
| 2014/0130126 A1* | 5/2014 | Jakobsson | H04L 63/08 726/3 |
| 2015/0007290 A1* | 1/2015 | Franck | G07C 9/37 726/7 |
| 2016/0112414 A1 | 4/2016 | Tsou | |
| 2016/0180078 A1* | 6/2016 | Chhabra | G06F 21/57 726/19 |
| 2016/0210407 A1* | 7/2016 | Hwang | G16B 50/00 |
| 2017/0143241 A1* | 5/2017 | McBain | G06V 20/64 |
| 2017/0228526 A1* | 8/2017 | Cudak | H04L 63/0861 |
| 2017/0346817 A1* | 11/2017 | Gordon | G06V 40/10 |
| 2018/0232591 A1* | 8/2018 | Hicks | G10L 17/10 |
| 2018/0307815 A1* | 10/2018 | Samadani | G06F 21/32 |
| 2019/0005215 A1* | 1/2019 | Faivre | G06F 21/316 |
| 2019/0065714 A1* | 2/2019 | Adams | G06F 21/32 |
| 2019/0149542 A1* | 5/2019 | Scopis | G06F 21/40 726/7 |
| 2019/0156071 A1* | 5/2019 | Kaladgi | G06F 21/6245 |
| 2019/0197224 A1* | 6/2019 | Smits | G06V 40/176 |
| 2019/0384901 A1* | 12/2019 | Osborn | G06F 9/542 |
| 2020/0110861 A1* | 4/2020 | Derakhshani | G06F 3/016 |
| 2020/0110862 A1* | 4/2020 | Derakhshani | G06K 9/6257 |
| 2020/0117780 A1* | 4/2020 | Kaladgi | G06F 21/40 |
| 2020/0128004 A1* | 4/2020 | Shattuck | G06N 3/04 |
| 2020/0151308 A1* | 5/2020 | Phillips | G06F 21/40 |
| 2020/0257787 A1* | 8/2020 | Eyole | A61B 5/378 |
| 2020/0327755 A1* | 10/2020 | Burris | G07C 9/257 |
| 2020/0349244 A1* | 11/2020 | Kim | G10L 17/00 |
| 2020/0366670 A1* | 11/2020 | Cordiner | H04W 12/64 |
| 2020/0380099 A1* | 12/2020 | Ridgill, II | G06F 21/31 |
| 2020/0401686 A1* | 12/2020 | Duchastel | G06F 21/36 |
| 2021/0089639 A1* | 3/2021 | Remillet | G06V 10/803 |

OTHER PUBLICATIONS

"International Search Report and Written Opinion Issued in PCT Application No. PCT/US2020/037344", dated Sep. 14, 2020, 12 Pages.

\* cited by examiner

COMBINING BIOMETRICS, HIDDEN KNOWLEDGE AND INTENT TO AUTHENTICATE

BACKGROUND

Computing devices commonly may be configured to require a user to provide login credentials such as a user ID and password in order to unlock the device, for the user to be given access to one or more resources, or otherwise permit authorized use of the computing device. Using a user ID and password for authentication are not without problems. First, mere possession of a user ID and corresponding password does not prove anything about the identity of the person who actually uses the user ID and password to login. That is, the password may be stolen or guessed and used by someone other than the owner of the account or computing device. In part to address this deficiency, substitute forms of authentication have recently become more common.

For example, computing devices may be configured to use face recognition or fingerprint scanning of a user to unlock the computing device or otherwise provide the user with access to resources controlled by the computing device. Such additional methods of authentication suffer from different problems. For example, face recognition as a means of unlocking a computing device suffers from the problem that a user may or may not have actually intended to trigger the unlocking. The face recognition unlock may be triggered accidentally, or instead a user could be forced to look at the camera or sensors by another person. Fingerprint scanning is no different and indeed, some fingerprint scanners and algorithms may be tricked by computationally generated fingerprints, or tricked by a recreation of a user's fingerprint lifted from some other surface. Likewise, a person may be physically forced to unlock a computing device by use of their finger. Unfortunately, current technologies for authentication do not provide sufficiently reliable means of verifying identity while simultaneously verifying intent to authenticate.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, computing devices and computer program products are described herein that enable computing devices to gather biometric and environmental data, and to authenticate users by using such data to evaluate some or all of: a user's identity, a user's intent to authenticate, and the user's possession of secret knowledge.

In an example aspect, a computing device is configured to verify a user's identity by evaluating biometric data such as face imaging, fingerprint scanning and/or iris scanning. In another aspect, the computing device is configured to verify the user's possession of secret knowledge by a) presenting a person with a randomly arranged and/or sampled set of objects, digits, letters, or the like, b) gathering biometric data regarding the user's reaction to the presentation, and c) evaluating the user's reaction. In an embodiment, the biometric data may comprise eye tracking data, and the computing device may be configured to use such data to verify that the person has gazed through the objects in a predetermined order.

In further aspects, a computing device may be configured to verify the user's intent to authenticate by combining such eye tracking data with other biometric data. For example, embodiments may gauge a physiological response of the user viewing one or more of the displayed objects, and to compare that response to previously recorded responses. Physiological and other types of biometric data may be used to evaluate the user for indicia of duress.

In another aspect, a computing device may use the evaluations of identity, intent and secret knowledge, and provide varying levels of device and/or resource access depending on a confidence level that is determined based on the evaluations. In a further aspect, embodiments may be configured to provide modified access to the computing device or resources stored thereon where indicia of duress have been detected. Embodiments may provide modified access to the device that outwardly appears as full access to the device, while preventing (e.g., undetectably preventing) access to items of information (e.g., secrets) stored on the device.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
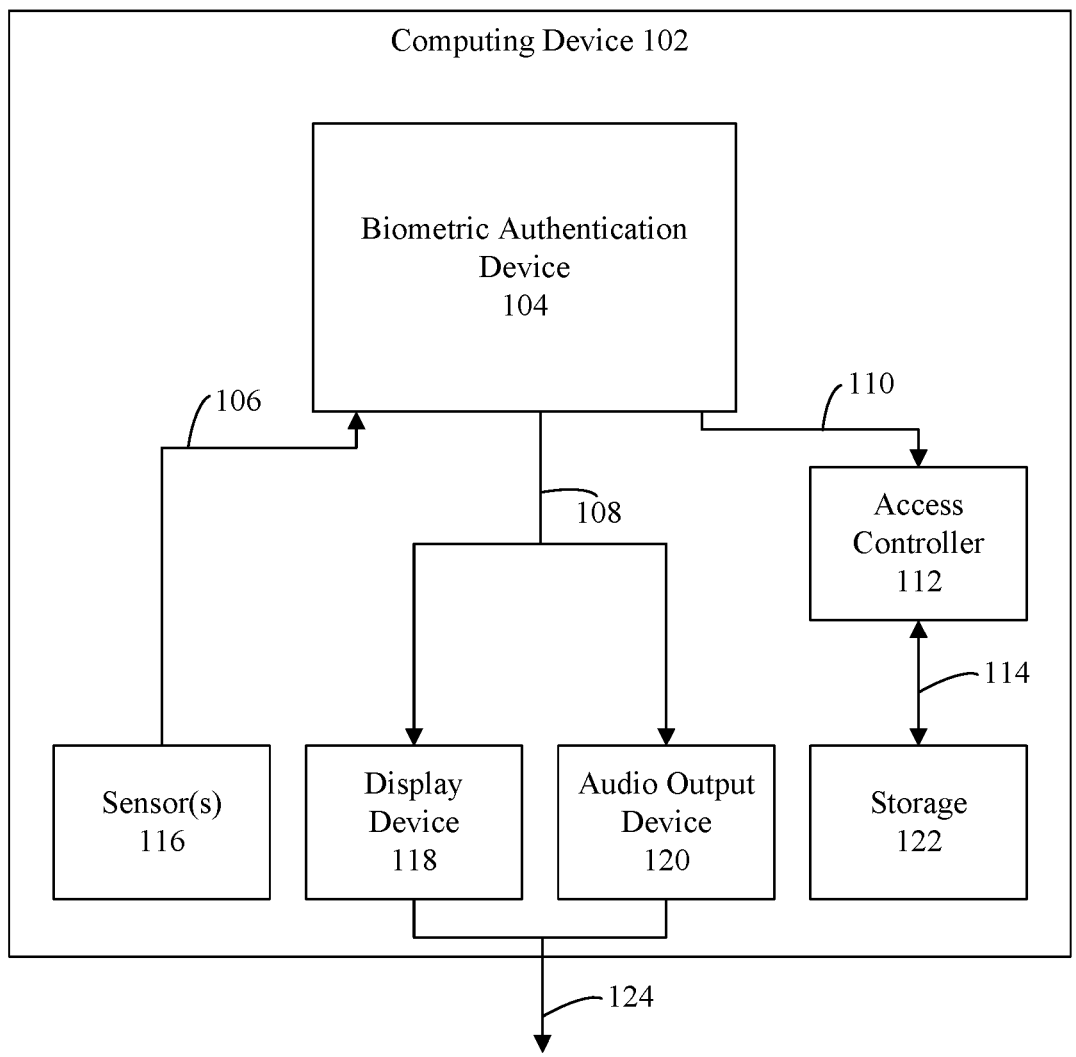
FIG. 1 depicts an example computing device including a biometric authentication device, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Authenticating a user by evaluations of the user's identity, intent to authenticate and secret knowledge may be accomplished in numerous ways. For example, FIG. 1 depicts an example computing device 102 including a biometric authentication device 104, according to an embodiment. As shown in FIG. 1, computing device 102 also includes an access controller 112, one or more sensors 116, a display device 118, an audio output device 120 and a storage 122. Other structural and operational embodiments will be apparent to persons skilled in the relevant art(s) based on the following discussion regarding computing device 102 as depicted in FIG. 1.

Embodiments of computing device 102 may include any type of mobile computer or computing device such as a handheld device (e.g., a Palm® device, a RIM Blackberry® device, a personal digital assistant (PDA)), a laptop computer, a notebook computer, a tablet computer (e.g., an Apple iPad™, a Microsoft Surface™, etc.), a netbook, a mobile phone (e.g., a smart phone such as an Apple iPhone, a Google Android™ phone, a Microsoft Windows® phone, etc.), a wearable device (e.g., virtual reality glasses, helmets, and visors, a wristwatch (e.g., an Apple Watch®)), and other types of mobile devices. In further embodiments, computing device 102 may be stationary computer or computing device, such as a desktop computer, gaming console, smart television, or the like.

In embodiments, biometric authentication device 104 is configured to receive sensor data 106 from sensors 116. Sensor(s) 116 may include virtually any type of biometric or environmental sensor. For example, sensor(s) 116 may include one or more cameras, one or more microphones, global positioning system ("GPS") devices or other devices suitable for determining the location of the computing device, inertial sensors such as accelerometers and/or angular rate sensors, temperature sensors, barometric pressure sensors, one or more fingerprint scanners including pressure sensitive fingerprint scanners, eye and gaze tracking sensors, iris scanner sensors, brainwave capture sensors and biometric heart rate, respiration and/or blood pressure sensors, in embodiments. The above described examples of sensor(s) 116 are merely exemplary, and additional types of sensors, transducers or environmental sensors for sensor(s) 116 may be employed, in embodiments.

In embodiments, sensor data 106 may include any type of information measured by or derived from the operation of sensor(s) 116. Sensor data 106 may include biometric data corresponding to the user of computing device 102. For example, biometric data may include eye tracking or eye movement data, gaze tracking, pupillary response, captured images of the user, a captured fingerprint (as well as a measure of the finger pressure applied to the scanner during capture), a brainwave capture of the user, the user's heart and/or respiration rate. In addition to biometric data corresponding to a direct measurement or sensing of aspects of the user, biometric data may further comprise other measures derived in whole or in part from direct biometric measures. For example, and as will be described in further detail below, biometric data may include a measure of the user's recognition and/or response time to a stimulus.

Sensor data 106 may also include environmental data corresponding to aspects of the operating environment of computing device 102. For example, a camera may capture images not only of the user, but the surrounding environment. Likewise, microphones may pick up ambient sounds of the environment. Furthermore, inertial sensors, temperature sensors, GPS and other location tracking sensors or software, and pressure sensors may each gather and provide additional sensor data 106 corresponding to environmental data or operational aspects of the computing device. As will be described in detail below, such types of sensor data 106 may be useful for evaluating a user's identity and/or intent to authenticate.

Embodiments of computing device 102 and biometric authentication device 104 are configured to accept sensor data 106 as described above, and to generate an authentication score 110 based thereon. As will be described in more detail herein below, embodiments of biometric authentication device 104 are configured to use sensor data 106 to evaluate the identity of the user, the user's intent to authenticate, and/or secret knowledge of the user. Such evaluations may, for example, comprise a probability that the user intends to authenticate, or that the user's identity matches an expected identity. As will be described in further detail herein below, such evaluations and/or probabilities may be generated at least in part from sensor data 106. Biometric authentication device 104 may be further configured to thereafter generate and provide authentication score 110 based on the above described evaluations.

In an embodiment, authentication score 110 may comprise an aggregate measure of confidence in the above described evaluations. For example, in one embodiment, authentication score 110 may take on values between 0 and 1.00, where 1.00 indicates that biometric authentication device 104 is completely certain of the user's identity, that the user indeed intends to authenticate, and that the user possesses the required secret knowledge. Similarly, an authentication score 110 having a very small value even shrinking to 0 may indicate that biometric authentication device 104 has very little confidence in one or more of the evaluations of identity, intent and/or secret knowledge of the user. Finally, a more middling value for authentication score 110 (e.g., 0.64) may reflect that biometric authentication device 104 made an ambiguous determination of the user's identity, intent, and/or secret knowledge. For example, suppose that although the user's identity and possession of secret knowledge have been verified with a high degree of confidence, that biometric data included in sensor data 106 (e.g., elevated heart rate, dilated or otherwise anomalous pupillary responses, and the like) causes biometric authentication device 104 to determine that the user may be under duress at the time of authentication, and accordingly generate a low probability that the requisite intent to authenticate is present. In such instances, the authentication score 110 generated by biometric authentication device 104 may indicate a less than perfect verification of one or more aspects being evaluated for the user.

In another embodiment, authentication score 110 may be multi-valued, including not only the above described numeric score reflective of identity, intent and secret knowledge, but also including a flag, numeric score, or some other indication that biometric authentication device 104 has detected indications of duress in the user based on its evaluation of sensor data 106. Still further, authentication score 110 may include a separate score for each of identity, intent and secret knowledge instead of or in addition to an aggregate score for all three aspects. Example uses of authentication score 110, including uses of such detected indications of duress, will be described in further detail below.

Computing device 102 of FIG. 1 also includes display device 118 and audio output device 120. Each of display device 118 and audio output device 120 may be configured to generate a stimulus that may be perceived by the user. As shown in FIG. 1, for example, biometric authentication device 104 may be configured to provide stimulus data 108 to display device 118 and/or audio output device 120, with such data being used to generate a visual and/or auditory output comprising stimulus 124. Stimulus data 108 may comprise one or more of, for example, video and/or still images for display by display device 118. Stimulus data 108 may alternatively or additionally comprise audio data suitable for reproduction by audio output device 120, in embodiments. Note, stimulus data 108 may include any or all of still images, video and/or audio data. As will be described in more detail below, a user's reaction to and/or interaction with stimulus 124 may permit embodiments to infer some or all of the user's identity, intent to authenticate and possession of secret knowledge. It should also be noted that although described herein in terms of an audio-visual stimulus, other types of stimuli may be provided in other embodiments. For example, computing device 102 may be configured to include a haptic feedback actuator (not shown), and to generate stimulus 124 by causing one or more vibrations of a pre-determined intensity, frequency and/or duration.

In an embodiment, access controller 112 of computing device 102 as shown in FIG. 1 may be configured to accept authentication score 110 from biometric authentication device 104. As described above, authentication score 110 may reflect a probability or confidence as determined by biometric authentication device 104 that each of identity, intent and/or secret knowledge have been demonstrated by the user. In embodiments, access controller 112 is configured to allow access to computing device 102 at a level that is proportional to authentication score 110. Thus, for example, where authentication score 110 reflects indications of detected duress in the user as described above, access controller 112 may be configured to permit access to the device (i.e., unlock the device) while simultaneously and hiding (e.g., undetectably hiding) one or more resources of computing device 102 from the user.

For example, suppose that storage 122 includes personal and private documents, or instead includes politically sensitive documents that could put the owner of the device at risk of harm should such documents be discovered. In embodiments, where biometric authentication device 104 detects one or more indications that the user is under duress during authentication and authentication score 110 reflects such detection, access controller 112 may be configured to unlock the device, but hide such personal or sensitive documents during the session. In an alternative embodiment, such documents may be hidden for a predetermined period of time regardless of how many authentication attempts are made. In still another embodiment, access controller 112 may instead permanently erase the documents from storage 122. Embodiments of computing device 102 may likewise be configured to maintain such files in storage 122 in an encrypted form that cannot be differentiated from empty space on disk. Thus, even where the owner of computing device 102 is physically compelled to unlock the device, embodiments configured to enforce the above described type of conditional access to computing device 102 may allow a user to maintain plausible deniability regarding their possession of sensitive documents. The level of restriction enforced on, and ultimate treatment of, private documents in storage 122 may depend on the type of duress indication detected, and the confidence biometric authentication device 104 has in the evaluation. Example means of detecting duress are described in further detail herein below.

Figure 2:
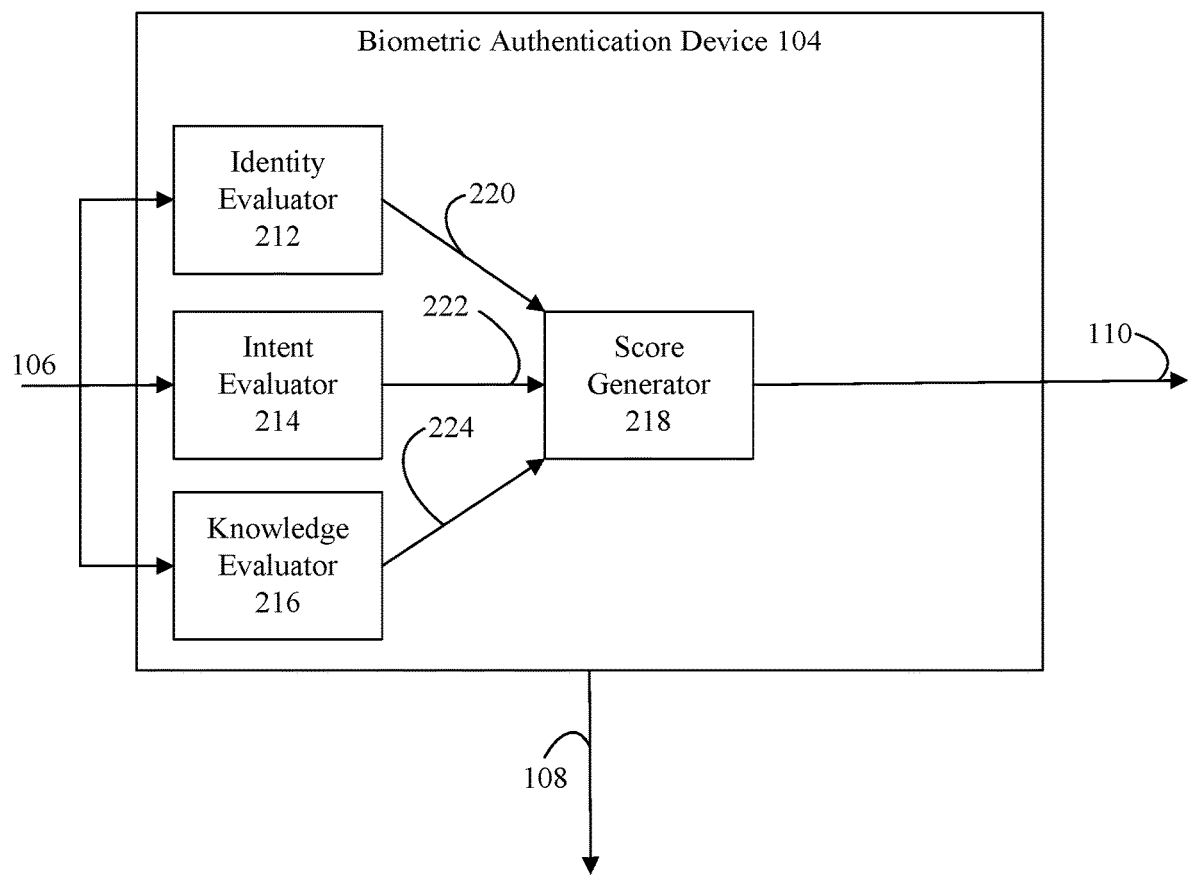
FIG. 2 depicts a detailed schematic view of an example biometric authentication device, according to an embodiment.

Embodiments of biometric authentication device 104 may be implemented in various ways to use the aforementioned sensor data 106 to evaluate a user's identity, intent and possession of secret knowledge. For example, FIG. 2 depicts a detailed schematic view 200 of biometric authentication device 104, according to an embodiment. As shown in FIG. 2, biometric authentication device 104 includes an identity evaluator 212, an intent evaluator 214, a knowledge evaluator 216, and score generator 218. Other structural and operational embodiments will be apparent to persons skilled in the relevant art(s) based on the following discussion regarding biometric authentication device 104 as depicted in FIG. 2.

As an initial matter, and as described above, biometric authentication device 104 as shown in FIG. 2 may be configured to generate stimulus data 108 and provide the same to devices external to biometric authentication device 104. Further, embodiments of biometric authentication device 104 are configured to receive sensor data 106 which may, as will be described in further detail below, include one or more measures that correspond to the user's reaction to configured to receive sensor data 106 and to generate authentication score 110 based at least in part thereon. Embodiments of biometric authentication device 104 may operate on such data through each of identity evaluator 212, intent evaluator 214 and knowledge evaluator 216, each of which will now be described in turn below, along with description.

Identity evaluator 212 of biometric authentication device 104 as depicted in FIG. 2 is configured to receive sensor data 106, and evaluate such data to determine the likely identity of the user. In an embodiment, such an evaluation by identity evaluator 212 may comprise identity score 220 comprising a tuple of the form (identity, identity_probability), where identity represents the most likely user based upon the evaluated sensor data 106, and identity_probability is the probability that the user corresponds to identity. In embodiments, and as described in part above, embodiments may determine the likely identity of the user in numerous ways.

For example, face recognition algorithms as known in the art may be applied to a captured image of the user's face. Similarly, face scanners may capture a 3D image of the user's face using, for example, IR or microwave radar and/or time-of-flight scanning techniques as known in the art. Identity evaluator 212 may also be configured to accept a recording of the user's voice and apply voice fingerprinting algorithms to determine the likely identity of the user. Similarly, although brainwave captures are typically more useful for determining a desire or other state of mind of the user, such brainwaves may also substitute for or augment other identity proving authentication technologies (e.g., iris scanning and/or fingerprint scanning).

Alternatively, embodiments may verify a user's identity based in whole or in part on an evaluation of a user's reaction to stimulus 124. For example, stimulus data 108 may comprise a series of still images that are displayed as stimulus 124 on display device 118. Sensor(s) 116 may thereafter gather sensor data 106 including biometric measures corresponding to the user at the time stimulus 124 is perceived by the user. Such perception may be detected, for example, through gaze tracking the user's eyes. The user's reaction to stimulus 124 may be gauged in a number of ways. For example, the user's brainwaves may be evaluated to determine when the user is viewing an image of special significance to the user. Alternatively, gaze tracking may detect the user's view of a particular image lingered for a period of time which may serve as a proxy for recognition. Such evaluations may also be performed by comparing the user's reactions (by whatever measure) to the user's prior reaction to the same stimulus.

Each of the abovementioned ways of verifying the identity of the user may employ, in embodiments, one or more suitably trained machine learning models. As described in further detail herein below, such models may be built using any of a number of readily available machine learning platform toolsets, and thereafter trained by application of training data as well as sensor data 106. For example, a user may repeatedly scan his/her index finger, and a machine learning model may be trained with the repeated scans to tune the model to the user's fingerprint. Similarly, face scanning, face recognition, brainwave and voice printing and iris scanning are all identification techniques amenable for use with a suitably trained machine learning model. It should be understood that embodiments need not rely on only one method of evaluating user identity from sensor data 106. Instead, embodiments may evaluate identity based on multiple measures. For example, sensor data 106 may include face scanner data, iris scanner data, and fingerprint scanner data, as well as a voice recording of the user. Such data may thereafter undergo feature extraction and other processing such as hashing, normalization or be otherwise feature engineered, and such feature engineered data provided as input to a suitably trained machine learning model. Of course, alternative algorithms for performing such functions are available, as known in the art, that do not require a machine learning model.

Intent evaluator 214 of biometric authentication device 104 as depicted in FIG. 2 is configured to receive sensor data 106, and evaluate such data to determine a likelihood that the user intends to authenticate. In an embodiment, such an evaluation by intent evaluator 214 may comprise intent score 222 representing a probability that the user intends to authenticate. Some embodiments may assume that the user intends to authenticate, and evaluate sensor data 106 for evidence that the user does not intend to authenticate, or is under duress. In such instances, intent score 222 may instead comprise a tuple of the form (intent score, duress_flag), where intent score is a probability that the user intends to authenticate, and duress_flag is set when embodiments of biometric authentication device 104 detect indicia of duress. In such instances, having a duress_flag that is false will enable embodiments to provide full access to computing device 102 or its available resources (provided of course that sufficient proof by the user of identity, intent and secret knowledge is provided). In an alternative embodiment, any apparent intent of the user to authenticate may be negated by detected indicia of duress. So for example, upon detection of indicia of duress, intent evaluator 214 of biometric authentication device 104 may be configured to generate an intent score of zero which may in turn prevent all access to computing device 102. In embodiments, and as described in part above, embodiments may determine intent and/or duress in numerous ways.

In certain situations, for example, a user's intent to authenticate may be inferred from actions the user is making. For example, the placement of the user's index finger on a fingerprint scanner is likely associated only with the act of authenticating. Accordingly, embodiments may infer such intent and attempt to determine whether the inference is invalid or weak. For example, face recognition algorithms and gaze tracking may each be employed to determine, for example, whether the user is looking directly at the camera sensor included in sensor(s) 116 of computing device 102. If the user is clearly looking away from the computing device and not actively attempting to authenticate, embodiments may reduce intent score 222 in response. Likewise, brainwave scans of a user may be inconsistent with previously recorded brainwaves corresponding to an authentication attempt. Even where such objective indicia of a lack of intent are missing, embodiments may nevertheless generate a low intent score 222 where intent evaluator 214 of biometric authentication device 104 detects indicia of duress in the user.

Intent evaluator 214 may detect duress in a user in various ways. For example, heart and respiration rates, pupillary response, a stressful facial appearance, anomalous brainwave readings, voice stress patterns and the like may each tend to indicate a user is under duress at authentication time. Intent evaluator 214 may evaluate each of the above mentioned types of biometric data to passively detect indicia of duress. In alternative embodiments, a user may configure one or more duress indicators that may be employed to signal to biometric authentication device 104 of computing device 102 that the user is under duress, and that access ought to be restricted. For example, fingerprint scanners may also incorporate pressure sensors, and a 'normal' authentication by the user could require not only a successful scan of the fingerprint, but pressure by the user's finger being applied only within a pre-configured range. More specifically, biometric authentication device 104 may be configured such that a user's 'normal' authentication requires a light pressure on the fingerprint scanner. In such a situation, the user may signal to biometric authentication device 104 that they are under duress by applying the finger with high pressure. Embodiments may act upon detected duress in one or more of the manners described above. Alternatively, and also as described above, embodiments may be configured to allow access to computing device 102 and/or resources available thereto conditioned upon no duress being detected (as well as upon proofs of user of identity, intent and secret knowledge). That is, full access to computing device 102 may be provided, in embodiments, where the proofs of user identity, intent and secret knowledge are provided *and* where, for example, heart and respiration rates and so forth are in normal ranges.

Knowledge evaluator 216 of biometric authentication device 104 as depicted in FIG. 2 is configured to receive sensor data 106, and evaluate such data to determine a likelihood that the user possesses secret knowledge required to authenticate. In an embodiment, such an evaluation by knowledge evaluator 216 may comprise knowledge score 224 representing a probability that the user possesses the required secret knowledge. In an embodiment, knowledge score 224 may comprise a Boolean value indicating simply that the user does or does not possess the required secret knowledge. In other embodiments, however, and for reasons discussed in more detail herein below, knowledge score 224 may comprise a value indicative of a probability that the user possesses the required secret knowledge. Such a probability may be less than 1 or greater than 0 depending on how knowledge evaluator 216 evaluates sensor data 106 to generate knowledge score 224, where such evaluation may be accomplished in numerous ways.

For example, in the manner described above, stimulus 124 may comprise a set of images displayed on display device 118, and possession of secret knowledge by the user may be demonstrated by the user gazing at the images in a predetermined order. In such an instance, sensor data 106 includes gaze measurements that reflect the where the user is looking at each moment. As known in the art, however, gaze measurements are not perfect, and it may be the case that the gaze measurements result in some ambiguity or otherwise be imprecise regarding where the user has been looking. In such instances, embodiments of knowledge evaluator 216 may not be capable of determining with perfect precision whether the user viewed the images of stimulus 124 in the required order inasmuch as gaze direction at any given moment may be ambiguous. If, however, gaze measurements indicate that the user gazed at, for example, 4 out of 5 images of stimulus 124 in the correct order, knowledge evaluator 216 may nevertheless set knowledge score to some relatively high value.

Gaze measurements included in sensor data 106 may also reflect not only the point where the user is looking at each moment, but how long the user spends looking at that point. The amount of time a person's gaze lingers on a particular point is generally known as "dwell time." In embodiments, dwell time measurements may also be used in whole or in part to demonstrate the possession of secret knowledge by the user. For example, stimulus 124 may comprise a set of images displayed on display device 118, where the set of images includes images with which the user is familiar, and consequently is likely to recognize fairly quickly. Additionally, the set of images may also include random images of which the user has no pre-existing knowledge. When all of the images of stimulus 124 are displayed on display device 118, dwell time measurements may be collected for user views of each image. In embodiments, gazes that include relatively low dwell times may serve as a proxy for the user's recognition of the corresponding images, and with such recognition in turn serving as a proof of the user's possession of secret knowledge.

In other embodiments, knowledge evaluator 216 may be configured to evaluate other types of sensor data 106 indicative of a user's possession of secret knowledge, but without being biometric data per se. For example, assuming that sensor data 106 includes data from inertial sensors as described above, a user could indicate possession of secret knowledge by tapping a predetermined pattern on the back of a phone while hold it in one hand, with each tap having a specific timing and intensity. For example, a user might tap out the rhythm to a particular song (e.g., the rhythm of "Shave and a Haircut" akin to 'dah-di-di-dah-di, di-dit'). The same sensor data 106 from inertial sensors may also be used by identity evaluator 212 discussed above to evaluate user identity. More specifically, the inertial signals generated by different users, even when tapping out the same rhythm, are likely to be detectably distinct given that each person will tap at a slightly different rate and with a different amount of force. Moreover, differences in hand size and strength as well as difference in the mass of the fingers may lead to detectable differences in inertial sensor readings for the same rhythm.

Further operational aspects of computing device 102 of FIG. 1, and biometric authentication device 104 of FIG. 2 will now be discussed in conjunction with FIG. 3 which depicts a flowchart 300 of an example method for providing resource access to a user based on evaluations of the user's identity, intent and/or secret knowledge, according to an embodiment. Flowchart 300 is described with reference to biometric authentication device 104 of FIG. 2. However, other structural and operational embodiments will be apparent to persons skilled in the relevant art(s) based on the following discussion regarding flowchart 300 of FIG. 3 and biometric authentication device 104 of FIG. 2.

Flowchart 300 begins at step 302. At step 302, a stimulus is presented to a user to be authenticated. For example, and with reference to biometric authentication device 104 of FIGS. 1 and 2, stimulus data 108 in the form of images, audio and/or video may be provided by biometric authentication device 104 for reproduction by, for example, display device 118 and/or audio output device 120 as shown in FIG. 1 and as described herein above. Flowchart 300 of FIG. 3 continues at step 304.

In step 304, biometric data regarding the user is gathered. For example, and with continued reference to computing device 102 of FIG. 1, and biometric authentication device 104 of FIGS. 1 and 2, sensor(s) 116 may be configured to collect sensor data 106 including biometric data regarding the user of computing device 102 in the manner described in detail above, in an embodiment. Flowchart 300 of FIG. 3 continues at step 306.

In step 306, a measure of the user's reaction to the stimulus is generated based at least in part on the biometric data. For example, and with continued reference to computing device 102 of FIG. 1, and biometric authentication device 104 of FIGS. 1 and 2, knowledge evaluator 216 of biometric authentication device 104 as shown in FIG. 2 is configured to accept sensor data 106 that includes biometric data, and generate a measure of the user's reaction to the stimulus based in part thereon, and in the manner described in detail above, in embodiments.

More specifically, biometric authentication device 104 may be configured to provide stimulus data 108 to display device 118 for display thereby, where stimulus data 108 comprises a plurality of images for display. Thereafter, sensor(s) 116 of computing device 102 of FIG. 1 are configured to generate a plurality of gaze measurements and provide same to knowledge evaluator 216 as part of sensor data 106. Flowchart 300 concludes at step 308.

At step 308, one or more of an identity of the user, an intent of the user to authenticate and secret knowledge of the user are evaluated based at least in part on the measure of the user's reaction to the stimulus and the biometric data. For example, and with continued reference to biometric authentication device 104 of FIGS. 1 and 2, each of identity evaluator 212, intent evaluator 214 and knowledge evaluator 216 of biometric authentication device 104 is be configured to accept sensor data 106 including biometric data and to evaluate each of an identity of the user an intent by the user to authenticate and secret knowledge of the user in the general manner described in detail above, in embodiments.

For example, knowledge evaluator 216 is configured, as described above, to evaluate the plurality of gaze measurements to determine whether the user gazed at the plurality of images in a predetermined order. Thus, in this example, knowledge evaluator 216 evaluates secret knowledge of the user based at least in part on gaze measurements of the user which comprise the user's reaction to the stimulus. In embodiments, and as described above, knowledge evaluator 216 may also be configured to evaluate secret knowledge of the user based at least in part on other types of biometric data regarding the user. For example, a brainwave capture of the user and/or a measure of the user's recognition time of the stimulus. Embodiments may be enabled to permit a range of recognition criteria. For example, the user's recognition may comprise things such as recognition of a particular face among other faces, or recognition of a face or pre-determined object or graphic within a jumbled image.

Additionally, identity evaluator 212 of biometric authentication device 104 as shown in FIG. 2 is configured, as described in detail above, to evaluate the identity of the user based at least in part on biometric data included in sensor data 106 such as, for example, a captured image of the user's face, a scan of the user's face, a brainwave capture of the user, a captured fingerprint, an iris scan of one of the user's eyes, and a measure of the user's response time to at least part of the stimulus.

Likewise, intent evaluator 214 of biometric authentication device 104 as shown in FIG. 2 is configured, as described in detail above, to evaluate the intent of the user to authenticate based at least in part on biometric data included in sensor data 106 such as, for example, a captured image of the user's face. Flowchart 300 concludes at step 310.

At step 310, the user is provided with access to a resource based at least in part on the one or more evaluations. For example, and with continued reference to biometric authentication device 104 of FIGS. 1 and 2, score generator 218 is configured to generate authentication score 110 based upon the above described evaluations of each of identity evaluator 212, intent evaluator 214 and knowledge evaluator 216, and as shown in FIG. 2. Authentication score 110 may thereafter be provided to access controller 112 that is configured to control access to computing device 102, as well as resources stored on storage 122, in the manner described in detail herein above.

In the foregoing discussion of steps 302-310 of flowchart 300, it should be understood that at times, such steps may be performed in a different order or even contemporaneously with other steps. For example, the one or more evaluations performed at step 308 may be performed continuously based on sensor data 106 provided to biometric authentication device 104 in real or near real-time. Likewise, biometric data included in sensor data 106 may be continuously gathered and used in the above mentioned evaluations even before a stimulus is presented to the user. Other operational embodiments will be apparent to persons skilled in the relevant art(s). Note also that the foregoing general description of the operation of biometric authentication device 104 is provided for illustration only, and embodiments of biometric authentication device 104 may comprise different hardware and/or software, and may operate in manners different than described above. Indeed, steps of flowchart 300 may be performed in various ways.

Figure 3:
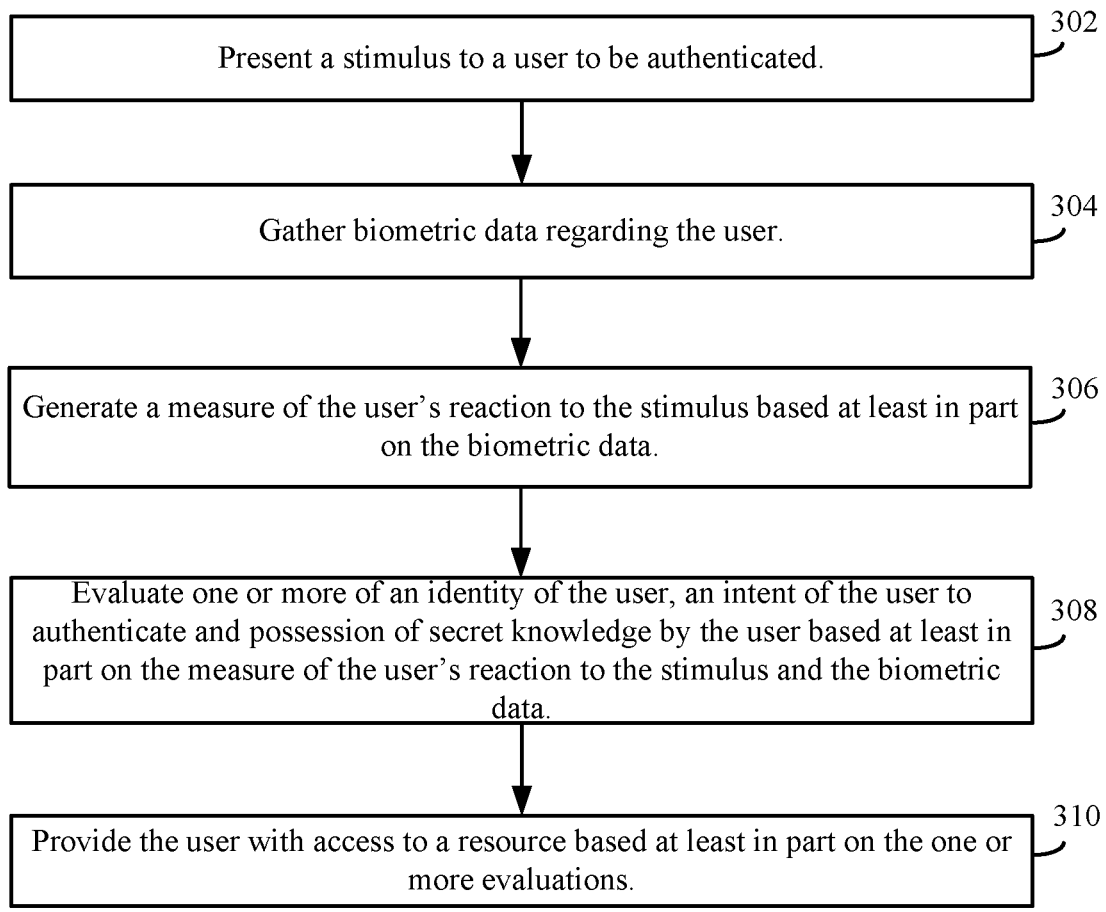
FIG. 3 depicts a flowchart of an example method for providing resource access to a user based on evaluations of the user's identity, intent and/or secret knowledge, according to an embodiment.
Figure 4:
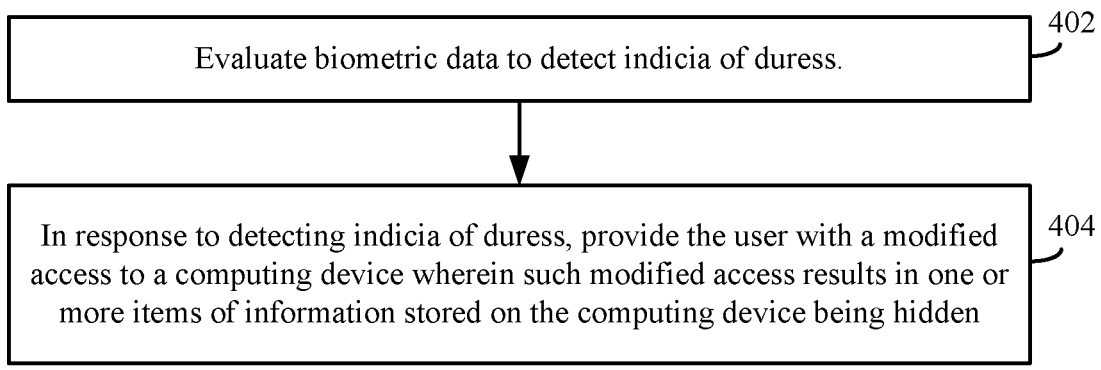
FIG. 4 depicts a flowchart of a refinement to the flowchart of FIG. 3 for providing modified resource access in response to detecting indicia of duress, according to an embodiment.

For example, FIG. 4 depicts a flowchart 400 of a method for providing modified resource access in response to detecting indicia of duress, according to an embodiment, and wherein flowchart 400 comprises refinements and/or additions to the method steps of flowchart 300 as depicted in FIG. 3, and described immediately above. Accordingly, flowchart 400 of FIG. 4 will also be described with continued reference to biometric authentication device 104 of FIGS. 1 and 2. However, other structural and operational embodiments will be apparent to persons skilled in the relevant art(s) based on the following discussion regarding flowchart 400.

In step 402, biometric data are evaluated to detect indicia of duress. For example, and with continued reference to biometric authentication device 104 of FIGS. 1 and 2, intent evaluator 214 of biometric authentication device 104 as depicted in FIG. 2 may operate to evaluate biometric data in the manner described in detail herein above. Flowchart 400 concludes at step 404.

In step 404, in response to detecting indicia of duress, the user is provided with a modified access to a computing device in response to detecting indicia of duress, and wherein such modified access results in one or more items of information (e.g., secrets) stored on the computing device being hidden (e.g., undetectably hidden). For example, and with continued reference to biometric authentication device 104 of FIGS. 1 and 2, intent evaluator 214 of biometric authentication device 104 may be configured to generate intent score 222 to include a duress flag that is subsequently received by access controller 112. In response, access controller 112 may operate in the general manner described above, and hide one or more secret documents on computing device 102 such that plausible deniability is maintained for the user.

In the foregoing discussion of steps 402 and 404 of flowchart 400, it should be understood that at times, such steps may be performed in a different order or even contemporaneously with other steps. For example, sensor(s) 116 as shown in FIG. 1 may continuously gather sensor data 106 including biometric data and provide same to biometric authentication device 104, and wherein biometric authentication device 104 is configured to continuously evaluate such biometric data to detect indicia of duress. Other operational embodiments will be apparent to persons skilled in the relevant art(s). Note also that the foregoing general description of the operation of biometric authentication device 104 is provided for illustration only, and embodiments of biometric authentication device 104 may comprise different hardware and/or software, and may operate in manners different than described above.

As described above, embodiments of biometric authentication device 104, including any of identity, intent and knowledge evaluators 212-216, respectively, or score generator 218, may operate in part with the assistance of a suitably trained machine learning model. For example, various machine learning platforms such as Keras or TensorFlow may permit the construction of an untrained machine learning model that may thereafter be trained, for example, with sensor data 106 gathered from sensor(s) 116 thereby permitting the operation of biometric authentication device 104 to be at least somewhat tailored to a particular user. Alternatively, embodiments may incorporate one or more pre-trained machine learning models. A general description of the construction and training of a machine learning follows herein below.

Figure 5:
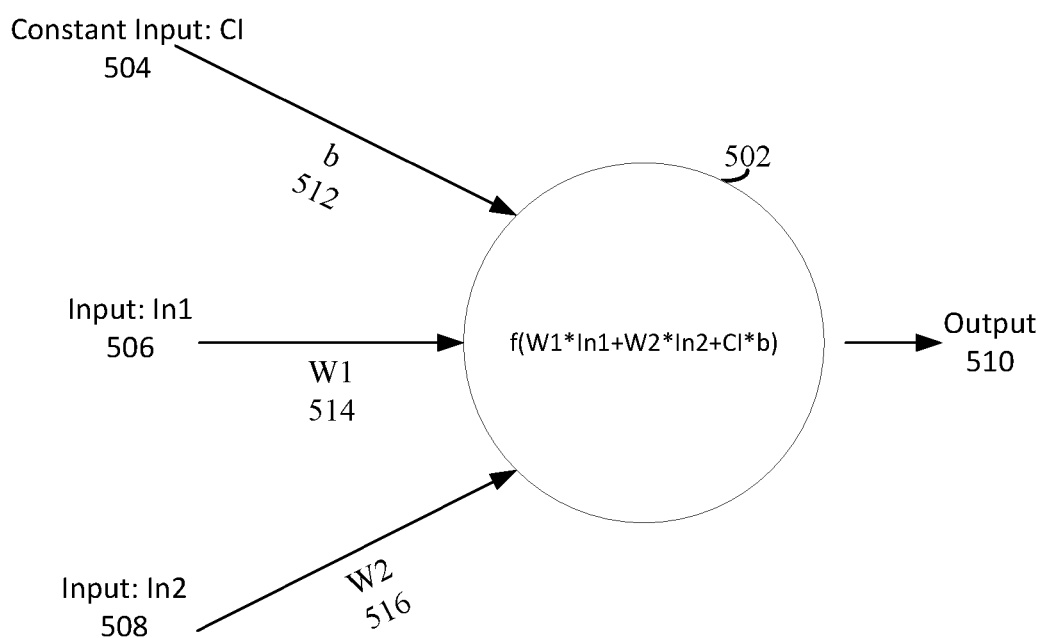
FIG. 5 depicts an example artificial neuron suitable for use in a deep neural network ("DNN"), according to an embodiment.

Whether wholly or partially trained using data gathered by computing device 102, or pre-trained prior to sale or deployment of computing device 102, embodiments may employ various machine learning platforms and algorithms. For example, Open Neural Network Exchange ("ONNX") models, or other types of machine learning models that may be available or generated, may be adapted by biometric authentication device 104 to generate authentication score 110 from sensor data 106. For example, a deep neural network ("DNN") may be constructed to generate one or more of identity score 220, intent score 222, knowledge score 216 and/or authentication score 110 based on sensor data 106. A DNN is a type of artificial neural network that conceptually is comprised of artificial neurons. For example, FIG. 5 depicts an example artificial neuron 500 suitable for use in a DNN, according to an embodiment. Neuron 500 includes an activation function 502, a constant input CI 504, an input In1 506, an input In2 508 and output 510. Neuron 500 of FIG. 5 is merely exemplary, and other structural or operational embodiments will be apparent to persons skilled in the relevant art(s) based on the following discussion regarding neuron 500 of FIG. 5.

Neuron 500 operates by performing activation function 502 on weighted versions of inputs CI 504, In1 506 and In2 508 to produce output 510. Inputs to activation function 502 are weighted according to weights b 512, W1 514 and W2 516. Inputs In1 506 and In2 508 may comprise, for example, normalized or otherwise feature processed data corresponding to sensor data 106. Activation function 502 is configured to accept a single number (i.e., in this example, the linear combination of weighted inputs) based on all inputs, and perform a fixed operation. As known in the art, such operations may comprise, for example, sigmoid, tanh or rectified linear unit operations. Input CI 504 comprises a constant value (commonly referred to as a 'bias') which may typically be set to the value 1, and allows the activation function 502 to include a configurable zero crossing point as known in the art.

Figure 6:
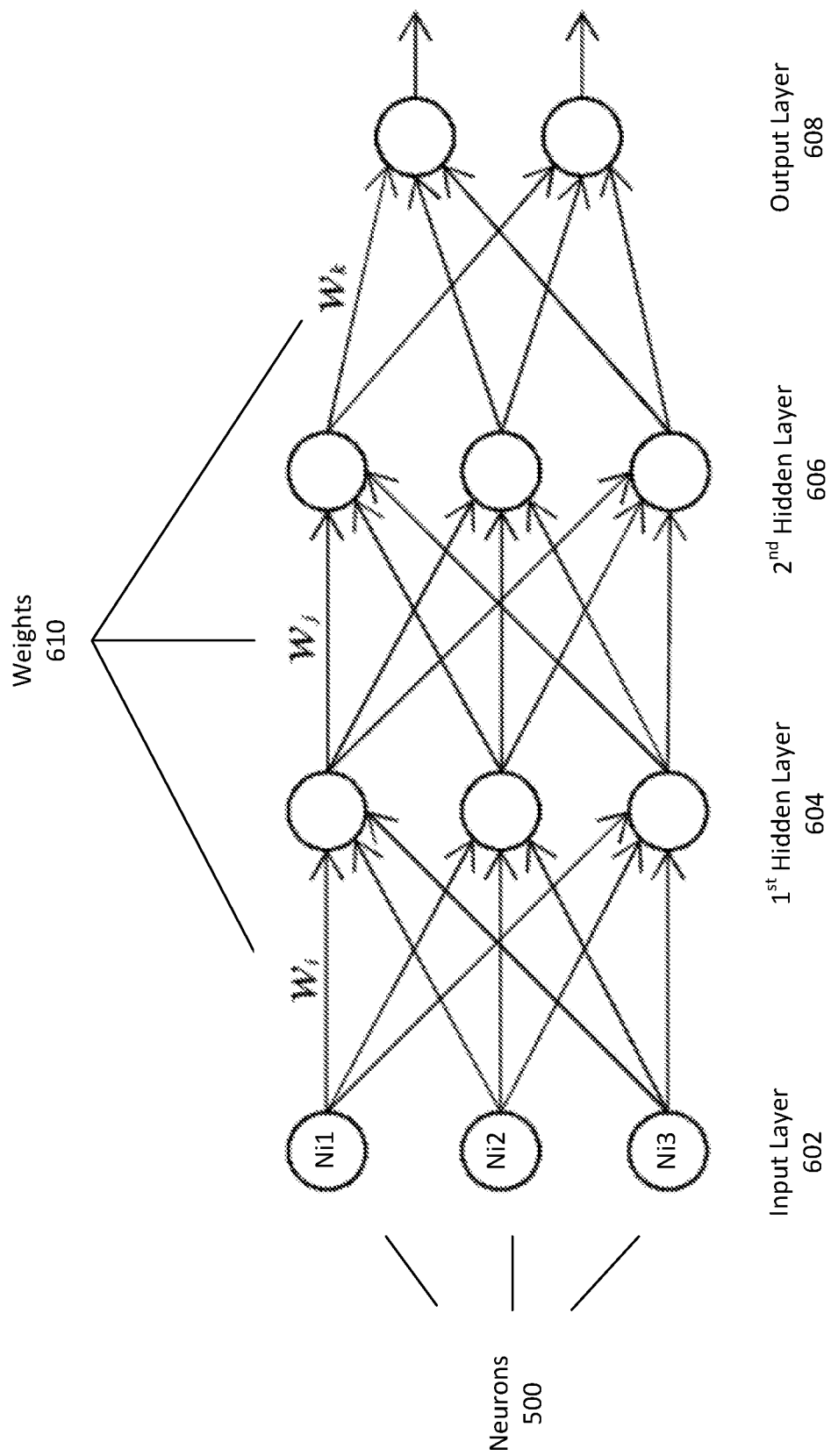
FIG. 6 depicts an example DNN composed of artificial neurons, according to an embodiment.

A single neuron generally will accomplish very little, and a useful machine learning model will require the combined computational effort of a large number of neurons working in concert. For example, FIG. 6 depicts an example deep neural network ("DNN") 600 composed of neurons 500, according to an embodiment. DNN 600 includes a plurality of neurons 500 assembled in layers and connected in a cascading fashion. Such layers include an input layer 600, a $1^{st}$ hidden layer 604, a $2^{nd}$ hidden layer 606 and an output layer 608. DNN 600 depicts outputs of each layer of neurons being weighted according to weights 610, and thereafter serving as inputs solely to neurons in the next layer. It should be understood, however, that other interconnection strategies are possible in other embodiments, and as is known in the art.

The neurons 500 of input layer 602 (labeled Ni1, Ni2 and Ni3) each may be configured to accept normalized or otherwise feature engineered or processed data corresponding to sensor data 106 as described above in relation to neuron 500 of FIG. 5. The output of each neuron 500 of input layer 602 is weighted according to the weight of weights 610 that corresponds to a particular output edge, and is thereafter applied as input at each neuron 500 of $1^{st}$ hidden layer 604. It should be noted that each edge depicted in DNN 600 corresponds to an independent weight, and labeling of such weights for each edge is omitted for the sake of clarity. In the same fashion, the output of each neuron 500 of $1^{st}$ hidden layer 604 is weighted according to its corresponding edge weight, and provided as input to a neuron 500 in $2^{nd}$ hidden layer 606. Finally, the output of each neuron 500 of $2^{nd}$ hidden layer 606 is weighted and provided to the inputs of the neurons of output layer 608. The output or outputs of the neurons 500 of output layer 608 comprises the output of the model. In the context of the descriptions above, such an output could comprise one of identity, intent or knowledge evaluations 220-224, respectively. Note, although output layer 608 includes two neurons 500, embodiments may instead include just a single output neuron 500, and therefore but a single discrete output. Note also, that DNN 600 of FIG. 6 depicts a simplified topology, and a producing useful inferences from a DNN like DNN 600 typically requires far more layers, and far more neurons per layer. Thus, DNN 600 should be regarded as a simplified example only.

Construction of the above described DNN 600 comprises only the start of generating a useful machine learning model. The accuracy of the inferences generated by such a DNN require selection of a suitable activation function, and thereafter each and every one of the weights of the entire model may be adjusted to provide accurate output. The process of adjusting such weights is called "training." Training a DNN, or other type of neural network, requires a collection of training data of known characteristics. For example, where a DNN is intended to predict the probability that an input image of a piece of fruit is an apple or a pear, the training data would comprise many different images of fruit, and typically including not only apples and pears, but also plums, oranges and other types of fruit. Training requires that the image data corresponding to each image is preprocessed according to normalization and/or feature extraction techniques as known in the art to produce input features for the DNN, and such features are thereafter input to the network. In the example above, such features would be input to the neurons of input layer 602.

Thereafter, each neuron 500 of DNN 600 performs their respective activation function operation, the output of each neuron 500 is weighted and fed forward to the next layer and so forth until outputs are generated by output layer 608. The output(s) of the DNN may thereafter be compared to the known or expected value of the output. The output of the DNN may then be compared to the expected value and the difference fed backward through the network to revise the weights contained therein according to a backward propagation algorithm as known in the art. With the model including revised weights, the same image features may again be input to the model (e.g., neurons 500 of input layer 602 of DNN 600 described above), and new output generated. Training comprises iterating the model over the body of training data and updating the weights at each iteration. Once the model output achieves sufficient accuracy (or outputs have otherwise converged and weight changes are having little effect), the model is said to be trained. A trained model may thereafter be used to evaluate arbitrary input data, the nature of which is not known in advance, nor has the model previously considered (e.g., a new picture of a piece of fruit), and output the desired inference (e.g., the probability that the image is that of an apple).

III. Example Mobile Device Implementation

Figure 7:
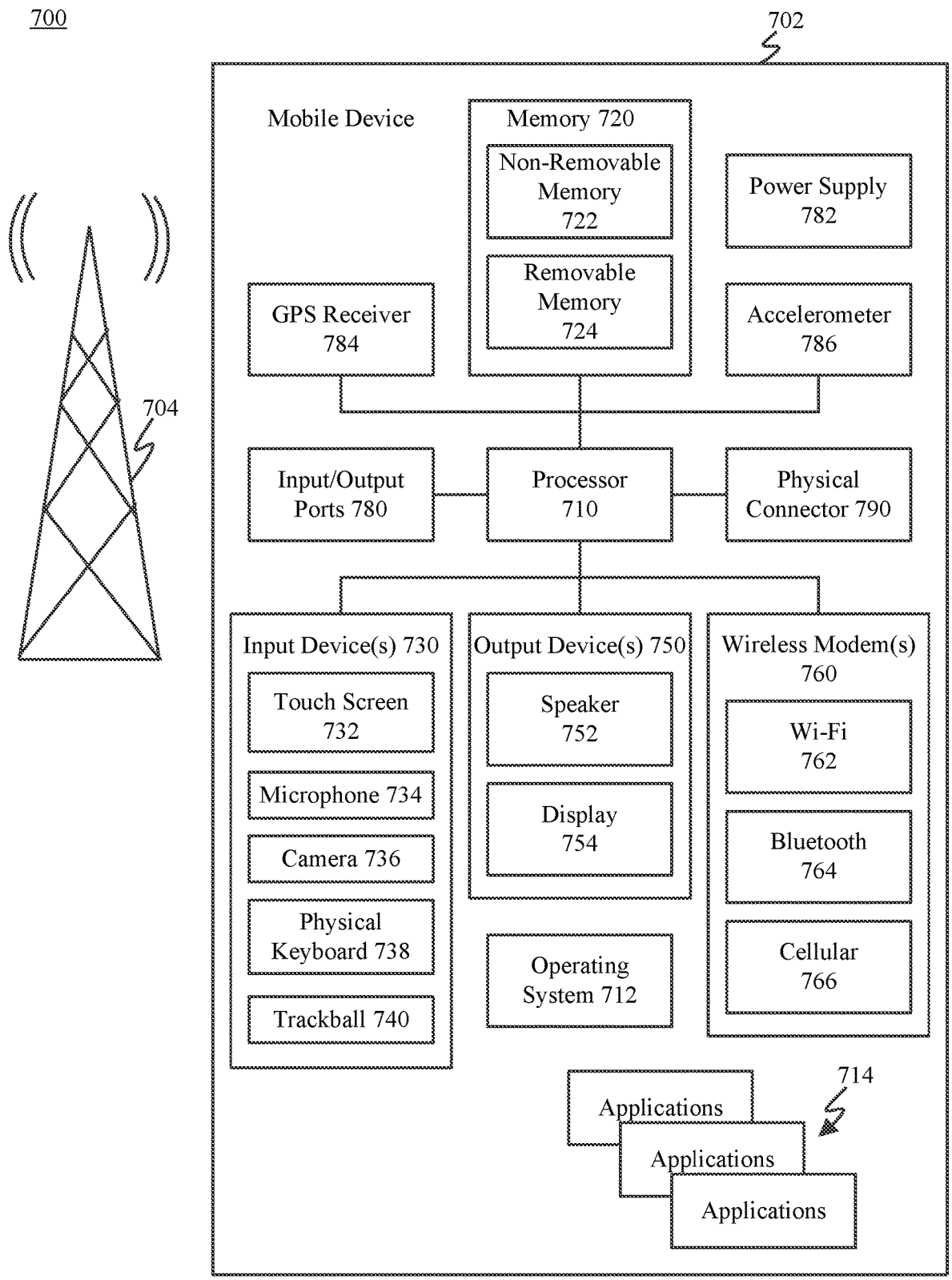
FIG. 7 is a block diagram of an example mobile device that may implement embodiments described herein.

FIG. 7 is a block diagram of an exemplary mobile device 702 that may implement embodiments described herein. For example, mobile device 702 may be used to implement biometric authentication device 104, identity evaluator 212, intent evaluator 214, knowledge evaluator 216 and/or score generator 218, and/or any of the components respectively described therein and/or any of the steps of any of flowcharts 300 and/or 400. As shown in FIG. 7, mobile device 702 includes a variety of optional hardware and software components. Any component in mobile device 702 can communicate with any other component, although not all connections are shown for ease of illustration. Mobile device 702 can be any of a variety of computing devices (e.g., cell phone, smart phone, handheld computer, Personal Digital Assistant (PDA), etc.) and can allow wireless two-way communications with one or more mobile communications networks 704, such as a cellular or satellite network, or with a local area or wide area network. Mobile device 702 can also be any of a variety of wearable computing device (e.g., a smart watch, an augmented reality headset, etc.).

Mobile device 702 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components of mobile device 702 and provide support for one or more application programs 714 (also referred to as "applications" or "apps"). Application programs 714 may include common mobile computing applications (e.g., e-mail applications, calendars, contact managers, web browsers, messaging applications) and any other computing applications (e.g., word processing applications, mapping applications, media player applications).

Mobile device 702 can include memory 720. Memory 720 can include non-removable memory 722 and/or removable memory 724. Non-removable memory 722 can include RAM, ROM, flash memory, a hard disk, or other well-known memory devices or technologies. Removable memory 724 can include flash memory or a Subscriber Identity Module (SIM) card, which is well known in GSM communication systems, or other well-known memory devices or technologies, such as "smart cards." Memory 720 can be used for storing data and/or code for running operating system 712 and application programs 714. Example data can include web pages, text, images, sound files, video data, or other data to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 702 can support one or more input devices 730, such as a touch screen 732, a microphone 734, a camera 736, a physical keyboard 738 and/or a trackball 740 and one or more output devices 750, such as a speaker 752 and a display 754. Other possible output devices (not shown) can include piezoelectric or other haptic output devices. Some devices can serve more than one input/output function. For example, touch screen 732 and display 754 can be combined in a single input/output device. Input devices 730 can include a Natural User Interface (NUI).

Wireless modem(s) 760 can be coupled to antenna(s) (not shown) and can support two-way communications between processor 710 and external devices, as is well understood in the art. Modem(s) 760 are shown generically and can include a cellular modem 766 for communicating with the mobile communication network 704 and/or other radio-based modems (e.g., Bluetooth 764 and/or Wi-Fi 762). At least one of wireless modem(s) 760 is typically configured for communication with one or more cellular networks, such as a GSM network for data and voice communications within a single cellular network, between cellular networks, or between the mobile device and a public switched telephone network (PSTN).

Mobile device 702 can further include at least one input/output port 780, a power supply 782, a satellite navigation system receiver 784, such as a Global Positioning System (GPS) receiver, an accelerometer 786, and/or a physical connector 790, which can be a USB port, IEEE 1594 (FireWire) port, and/or RS-232 port. The illustrated components of mobile device 702 are not required or all-inclusive, as any components can be deleted and other components can be added as would be recognized by one skilled in the art.

In an embodiment, mobile device 702 is configured to implement any of the above-described features of biometric authentication device 104, identity evaluator 212, intent evaluator 214, knowledge evaluator 216 and/or score generator 218, and/or any of the components respectively described therein and/or any of the steps of any of flowcharts 300 and/or 400. Computer program logic for performing the functions of these devices may be stored in memory 720 and executed by processor 710.

IV. Example Computer System Implementation

Each of biometric authentication device 104, identity evaluator 212, intent evaluator 214, knowledge evaluator 216 and/or score generator 218, and flowcharts 300 and/or 400 may be implemented in hardware, or hardware combined with software and/or firmware. For example, biometric authentication device 104, identity evaluator 212, intent evaluator 214, knowledge evaluator 216 and/or score generator 218, and flowcharts 300 and/or 400 may be implemented as computer program code/instructions configured to be executed in one or more processors and stored in a computer readable storage medium. Alternatively, biometric authentication device 104, identity evaluator 212, intent evaluator 214, knowledge evaluator 216 and/or score generator 218, and flowcharts 300 and/or 400 may be implemented as hardware logic/electrical circuitry.

For instance, in an embodiment, one or more, in any combination, of biometric authentication device 104, identity evaluator 212, intent evaluator 214, knowledge evaluator 216 and/or score generator 218, and flowcharts 300 and/or 400 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
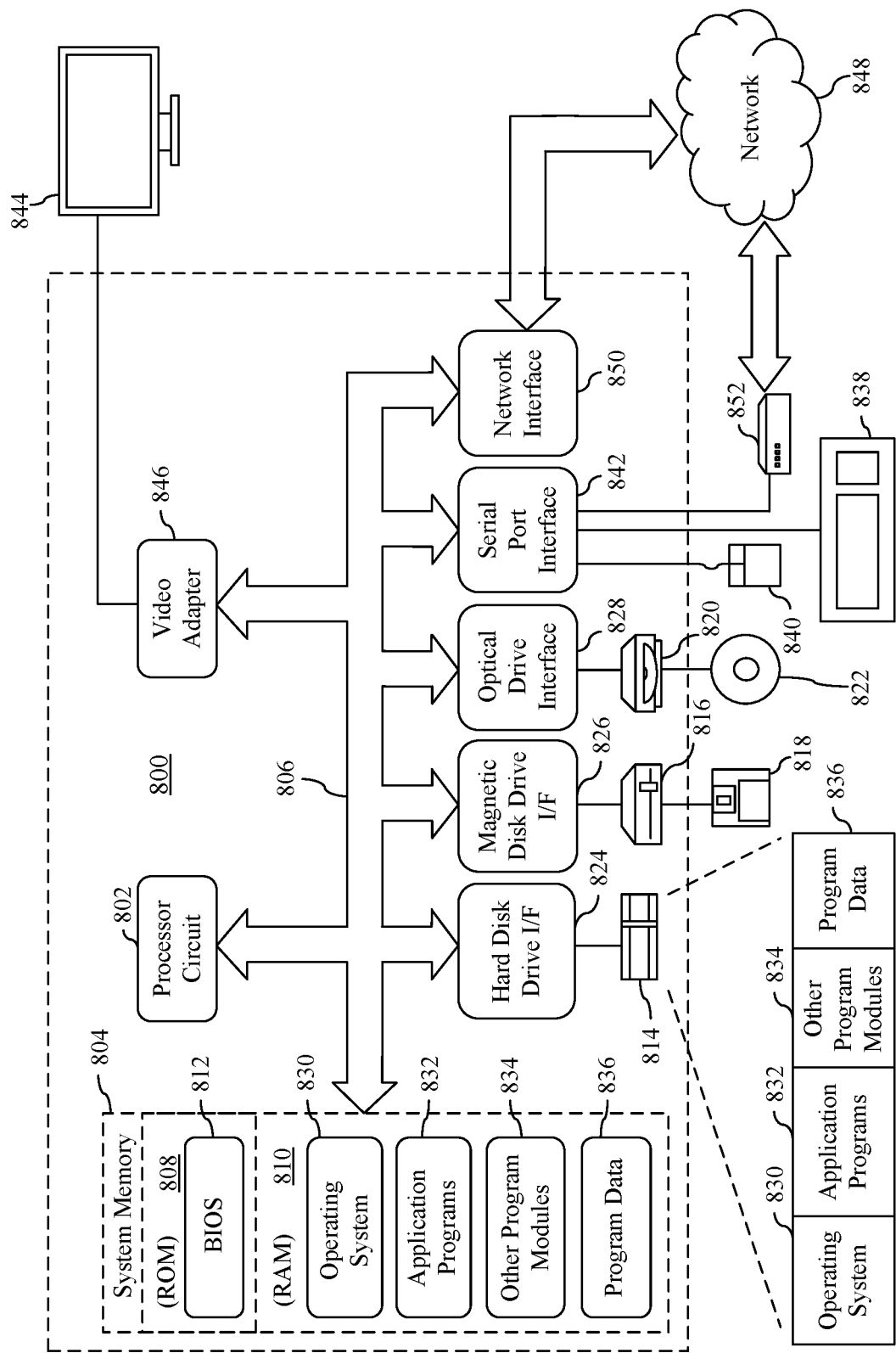
FIG. 8 is a block diagram of an example computer system in which embodiments may be implemented.

FIG. 8 depicts an exemplary implementation of a computing device 800 in which embodiments may be implemented. For example, user device 138 and server(s) 140 may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing biometric authentication device 104, identity evaluator 212, intent evaluator 214, knowledge evaluator 216 and/or score generator 218, and flowcharts 300 and/or 400 (including any suitable step of flowcharts 300 and/or 400), and/or further embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments described herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Embodiments

A biometric authentication method is provided herein. The method comprising: presenting a stimulus to a user to be authenticated; gathering biometric data regarding the user; generating a measure of the user's reaction to the stimulus based at least in part on the biometric data; evaluating one or more of an identity of the user, an intent of the user to authenticate and possession of secret knowledge by the user based at least in part on the measure of the user's reaction to the stimulus and the biometric data; and providing the user with access to a resource based at least in part on the one or more evaluations.

In an embodiment of the foregoing method, the stimulus comprises at least one of: the display of one or more graphical objects; the playback of one or more audio recordings; or the playback of one or more video recordings.

In another embodiment of the foregoing method, the biometric data includes at least one of: a plurality of gaze measurements; a captured image of the user's face; a can of the user's face; a recording of the user's voice; an iris scan of one of the user's eyes; a captured fingerprint; a brainwave capture of the user; the user's heart rate; the user's respiration rate; the user's pupillary response; a measure of the user's recognition time to at least part of the stimulus; or a measure of the user's response time to at least part of the stimulus.

In one embodiment of the foregoing method, evaluating the possession of secret knowledge by the user comprises evaluating of at least one of: the plurality of gaze measurements, the brainwave capture of the user and the measure of the user's recognition time of the stimulus.

In an embodiment of the foregoing method, the stimulus further comprises the simultaneous display of a plurality of images, and evaluating the plurality of gaze measurements comprises determining from the plurality of gaze measurements at least one of the following: whether the user gazed at the plurality of images in a predetermined order; or whether the user recognized one or more of the plurality of images based at least in part on gaze dwell time measurements.

In another embodiment of the foregoing method, evaluating the identity of the user comprises evaluating at least one of the following: the captured image of the user's face; the scan of the user's face; the recording of the user's voice; the brainwave capture of the user; the iris scan of one of the user's eyes; the captured fingerprint of the user; or the measure of the user's response time to at least part of the stimulus.

In one embodiment of the foregoing method, evaluating the intent of the user to authenticate comprises applying a face recognition algorithm to the captured image of the user's face to determine the probability that the user intends to be authenticated.

In an embodiment of the foregoing method, evaluating the intent of the user to authenticate further comprises evaluating at least one of the following to detect indicia of duress: the captured image of the user's face; the plurality of gaze measurements; the brainwave capture of the user; the user's heart rate; the user's respiration rate; or the user's pupillary response.

In another embodiment of the foregoing method, the method further comprises: in response to detecting indicia of duress, providing the user with a modified access to a computing device wherein such modified access results in one or more items of information stored on the computing device being hidden.

In one embodiment of the foregoing method, the method further comprises: generating an authentication score based at least in part on the one or more evaluations; and wherein providing the user with access to the resource based at least in part on the one or more evaluations comprises providing access to the resource to the user that is proportional to the generated authentication score.

A computing device is provided herein. In an embodiment, the computing device comprises: a one or more of sensors configured to collect biometric information regarding a user of the computing device; a biometric authenticator configured to: evaluate one or more of an identity of the user, an intent of the user to authenticate and possession of secret knowledge by the user to provide respective one or more evaluations, the one or more evaluations based at least in part on the biometric information; and generate an authentication score based on the one or more evaluations; wherein the computing device is configured to provide the user with access to a resource based at least in part on the authentication score.

In another embodiment of the foregoing computing device, the biometric information comprises information corresponding to the user's response to one or more of a display of one or more graphical objects, the playback of one or more audio recordings, and the playback of one or more video recordings.

In an embodiment of the foregoing computing device, the biometric information further comprises at least one of: a plurality of gaze measurements; a captured image of the user's face; a scan of the user's face; a recording of the user's voice; an iris scan of one of the user's eyes; a captured fingerprint of the user; a brainwave capture of the user; the user's heart rate; the user's respiration rate; the user's pupillary response; a measure of the user's recognition time of a stimulus; or a measure of the user's response time to at least part of a stimulus.

In one embodiment of the foregoing computing device, the biometric authenticator is configured to evaluate the possession of secret knowledge by the user based on at least one of: the plurality of gaze measurements, the brainwave capture of the user and the measure of the user's recognition time of the stimulus.

In another embodiment of the foregoing computing device, the biometric information further comprises information corresponding to the user's response to a simultaneous display of a plurality of images, and evaluating the plurality of gaze measurements comprises at least one of the following: whether the user gazed at the plurality of images in a predetermined order; or whether the user recognized one or more of the plurality of images based at least in part on gaze dwell time measurements.

In an embodiment of the foregoing computing device, the biometric authenticator is configured to evaluate the identity of the user based on at least one of the following: the captured image of the user's face; the scan of the user's face; the recording of the user's voice; the brainwave capture of the user; the iris scan of one of the user's eyes; the captured fingerprint of the user; or the measure of the user's response time to at least part of the stimulus.

In another embodiment of the foregoing computing device, the biometric authenticator is configured to evaluate the intent of the user to authenticate by applying a face recognition algorithm to the captured image of the user's face to determine a probability that the user intends to be authenticated.

In one embodiment of the foregoing computing device, the biometric authenticator is further configured to evaluate the intent of the user to authenticate based on an evaluation of at least one of the following to detect indicia of duress: the captured image of the user's face; the plurality of gaze measurements; the brainwave capture of the user; the user's heart rate; the user's respiration rate; or the user's pupillary response.

In an embodiment of the foregoing computing device, in response to the biometric authenticator detecting indicia of duress, the computing device is configured to provide the user with a modified access to the computing device, wherein such modified access results in one or more items of information stored by the computing device being hidden.

A computer program product is provided here, the computer program product comprising a computer-readable memory device having computer program logic recorded thereon that when executed by at least one processor of a computing device causes the at least one processor to perform operations for providing biometric authentication to a user, the operations comprising: presenting a stimulus to a user to be authenticated; gathering biometric data regarding the user; generating a measure of the user's reaction to the stimulus based at least in part on the biometric data; generating an authentication score based on evaluations of one or more of an identity of the user, an intent of the user to authenticate and possession of secret knowledge by the user, wherein the one or more evaluations are based at least in part the measure of the user's reaction to the stimulus; and providing the user with access to a resource based at least in part on the authentication score.

VI. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A biometric authentication method comprising:
presenting a stimulus to a user to be authenticated;
gathering biometric data regarding the user;
generating a measure of the user's reaction to the stimulus, based at least in part on the biometric data, that includes a measure of a response time of the user to at least a part of the stimulus;
evaluating one or more authentication factors including an identity of the user, an intent of the user to authenticate, and possession of secret knowledge by the user based at least in part on the measure of the user's reaction to the stimulus and the biometric data;
determining that the intent of the user to authenticate includes duress indicia based at least in part on the evaluation of the one or more authentication factors;
providing the user with access to a first data of the user based at least in part on the evaluation of the one or more authentication factors; and
preventing access by the user to a second data of the user, based at least in part on the duress indicia, by hiding the second data of the user for a predetermined period of time regardless of a number of authentication attempts made by the user.

2. The biometric authentication method of claim 1 wherein the stimulus comprises at least one of:
the display of one or more graphical objects;
the playback of one or more audio recordings; or
the playback of one or more video recordings.

3. The biometric authentication method of claim 2 wherein the biometric data includes at least one of:
a plurality of gaze measurements;
a captured image of the user's face;
a scan of the user's face;
a recording of the user's voice;
an iris scan of one of the user's eyes;
a captured fingerprint;
a brainwave capture of the user;
the user's heart rate;
the user's respiration rate;
the user's pupillary response; or
a measure of the user's recognition time to at least part of the stimulus.

4. The biometric authentication method of claim 3 wherein evaluating the possession of secret knowledge by the user comprises evaluating of at least one of: the plurality of gaze measurements, the brainwave capture of the user or the measure of the user's recognition time of the stimulus.

5. The biometric authentication method of claim 4 wherein the stimulus further comprises the simultaneous display of a plurality of images, and evaluating the plurality of gaze measurements comprises determining from the plurality of gaze measurements at least one of the following:
whether the user gazed at the plurality of images in a predetermined order; or
whether the user recognized one or more of the plurality of images based at least in part on gaze dwell time measurements.

6. The biometric authentication method of claim 3 wherein evaluating the identity of the user comprises evaluating at least one of the following:
the captured image of the user's face;
the scan of the user's face;
the recording of the user's voice;
the brainwave capture of the user;
the iris scan of one of the user's eyes;
the captured fingerprint of the user; or
the measure of the user's response time to at least part of the stimulus.

7. The biometric authentication method of claim 6 wherein evaluating the intent of the user to authenticate comprises applying a face recognition algorithm to the captured image of the user's face to determine a probability that the user intends to be authenticated.

8. The biometric authentication method of claim 7 wherein evaluating the intent of the user to authenticate further comprises evaluating at least one of the following to detect indicia of duress:
the captured image of the user's face;
the plurality of gaze measurements;

the brainwave capture of the user;
the user's heart rate;
the user's respiration rate; or
the user's pupillary response.

9. The biometric authentication method of claim 8 further comprising:
in response to detecting indicia of duress, providing the user with a modified access to a computing device wherein such modified access results in one or more items of secret information stored on the computing device being hidden.

10. The biometric authentication method of claim 1, further comprising:
generating an authentication score based at least in part on the evaluation of the one or more authentication factors; and
wherein providing the user with access to the first data of the user based at least in part on the evaluation of the one or more authentication factors comprises providing access to the first data of the user to the user that is proportional to the generated authentication score.

11. A computing device, comprising:
one or more sensors configured to collect biometric information regarding a user of the computing device;
a biometric authenticator configured to:
evaluate one or more authentication factors including an identity of the user, an intent of the user to authenticate, and possession of secret knowledge by the user based at least in part on the biometric information that includes a measure of a response time of the user to at least a part of a stimulus;
generate an authentication score based at least in part on the evaluation of the one or more authentication factors; and
determine that the intent of the user to authenticate includes duress indicia based at least in part on the evaluation of the one or more authentication factors;
wherein the computing device is configured to:
provide the user with access to a first data of the user based at least in part on the authentication score; and
prevent access by the user to a second data of the user, based at least in part on the duress indicia, by hiding the second data of the user for a predetermined period of time regardless of a number of authentication attempts made by the user.

12. The computing device of claim 11, wherein the biometric information comprises information corresponding to the user's response to one or more of a display of one or more graphical objects, the playback of one or more audio recordings, and the playback of one or more video recordings.

13. The computing device of claim 12, wherein the biometric information further comprises at least one of:
a plurality of gaze measurements;
a captured image of the user's face;
a scan of the user's face;
a recording of the user's voice;
an iris scan of one of the user's eyes;
a captured fingerprint of the user;
a brainwave capture of the user;
the user's heart rate;
the user's respiration rate;
the user's pupillary response; or
a measure of the user's recognition time of the stimulus.

14. The computing device of claim 12, wherein the biometric authenticator is configured to evaluate the possession of secret knowledge by the user based on at least one of:
the plurality of gaze measurements, the brainwave capture of the user, or the measure of the user's recognition time of the stimulus.

15. The computing device of claim 14, wherein the biometric information further comprises information corresponding to the user's response to a simultaneous display of a plurality of images, and evaluating the plurality of gaze measurements comprises evaluating at least one of the following:
whether the user gazed at the plurality of images in a predetermined order; or
whether the user recognized one or more of the plurality of images based at least in part on gaze dwell time measurements.

16. The computing device of claim 13, wherein the biometric authenticator is configured to evaluate the identity of the user based on at least one of the following:
the captured image of the user's face;
the scan of the user's face;
the recording of the user's voice;
the brainwave capture of the user;
the iris scan of one of the user's eyes;
the captured fingerprint of the user; or
the measure of the user's response time to at least part of the stimulus.

17. The computing device of claim 16 wherein the biometric authenticator is configured to evaluate the intent of the user to authenticate by applying a face recognition algorithm to the captured image of the user's face to determine a probability that the user intends to be authenticated.

18. The computing device of claim 17 wherein the biometric authenticator is further configured to evaluate the intent of the user to authenticate based on an evaluation of at least one of the following to detect indicia of duress:
the captured image of the user's face;
the plurality of gaze measurements;
the brainwave capture of the user;
the user's heart rate;
the user's respiration rate; or
the user's pupillary response.

19. The computing device of claim 18, wherein in response to the biometric authenticator detecting indicia of duress, the computing device is configured to provide the user with a modified access to the computing device, wherein such modified access results in one or more items of secret information stored by the computing device being hidden.

20. A computer program product comprising a computer-readable memory device having computer program logic recorded thereon that when executed by at least one processor of a computing device causes the at least one processor to perform operations, the operations comprising:
presenting a stimulus to a user to be authenticated;
gathering biometric data regarding the user;
generating a measure of the user's reaction to the stimulus based at least in part on the biometric data that includes a measure of a response time of the user to at least a part of the stimulus;
generating an authentication score based at least in part on an evaluation of one or more authentication factors including an identity of the user, an intent of the user to authenticate and possession of secret knowledge by the user, wherein the evaluation of the one or more authentication factors is based at least in part the measure of the user's reaction to the stimulus;

determining that the intent of the user to authenticate includes duress indicia based at least in part on the evaluation of the one or more authentication factors;

providing the user with access to a first data of the user based at least in part on the authentication score; and preventing access by the user to a second data of the user, based at least in part on the duress indicia, by hiding the second data of the user for a predetermined period of time regardless of a number of authentication attempts made by the user.

\* \* \* \* \*